United States Patent [19]

Annicchiarico et al.

[11] Patent Number: 4,822,271

[45] Date of Patent: Apr. 18, 1989

[54] MACHINE FOR THE MANUFACTURE OF SHORT CUT PASTA, IN PARTICULAR ORECCHIETTE, CAVATELLI ETC.

[76] Inventors: Franco Annicchiarico; Adima Pilari, Both of Via Roma, 12, 40065 Pianoro (Bologna), Italy

[21] Appl. No.: 194,487

[22] Filed: May 16, 1988

[30] Foreign Application Priority Data

May 29, 1987 [IT] Italy .................................. 3499 A/87

[51] Int. Cl.[4] .............................................. B29C 47/08
[52] U.S. Cl. .................................... 425/296; 425/297; 425/302.1; 425/305.1; 425/377; 426/496; 426/503
[58] Field of Search ...................... 425/296, 297, 302.1, 425/305.1, 377; 426/451, 496, 502, 503, 512, 557

[56] References Cited

FOREIGN PATENT DOCUMENTS 17424 9/1967 Japan .................................... 425/296

Primary Examiner—Jay H. Woo
Assistant Examiner—Timothy W. Heitbrink
Attorney, Agent, or Firm—Fay, Sharpe, Beall, Fagan, Minnich & McKee

[57] ABSTRACT

An improved machine for manufacturing short cut varieties of Italian pasta ("orecchiette", etc.) comprises three cascaded units: a first unit, with screw feeders, by which pasta mix is fed in and extruded into sticks; a second unit by which the pasta sticks are cut into cylindrical pellets; and a third unit by which the pasta pellets are gathered up and shaped, comprising a first knurled roller and a forming plate with a bead, which operate in conjunction to the end of flattening and curling the pellet, and a second roller in soft material that rotates in the opposite direction to the first roller and interacts with a third roller, carrying a projection, to form the pasta into the typical cup shape of the varieties in question.

12 Claims, 3 Drawing Sheets

MACHINE FOR THE MANUFACTURE OF SHORT CUT PASTA, IN PARTICULAR ORECCHIETTE, CAVATELLI ETC.

BACKGROUND OF THE INVENTION

The invention relates to an improved machine for the manufacture of short cut pasta, in particular, small, cupped shape varieties known as "orecchiette" and "cavatelli", etc.

Hitherto, the manufacture of certain types of pasta requiring a lengthy preparation has always been a manual process. Now, however, there is demand on the Italian and international markets alike for large quantities of determined pasta varieties, so that it has become practically impossible to produce such varieties in bulk without occasioning enormous production costs, dictated by the need to employ a great many skilled hands.

Accordingly, the object of the invention is to embody precision, high-speed automatic machinery that will turn out large quantities of small pasta varieties such as those of typically cupped shape (orecchiette, cavatelli etc.).

SUMMARY OF THE INVENTION

The machine disclosed consists substantially in three cascaded units: a first with screw feeders, by which pasta mix is fed in and extruded into sticks; a second, which cuts the pasta sticks into discrete cylindrical pellets, and a third, by which the pasta pellets are gathered up and shaped.

The third unit comprises a first, knurled roller and a forming plate with a beaded edge, the combined operation of which flattens and curls the pellet, and a second roller in soft material that rotates in the opposite direction to that of the first roller and is engaged by projections issuing from a third roller, which impinge on the pasta, forming it into the typical cup shape envisaged.

BRIEF DESCRIPTION OF THE DRAWINGS

The invention will now be described in detail, by way of example, with aid of the accompanying drawings, in which.

DESCRIPTION of the PREFERRED EMBODIMENTS

Figure 1:
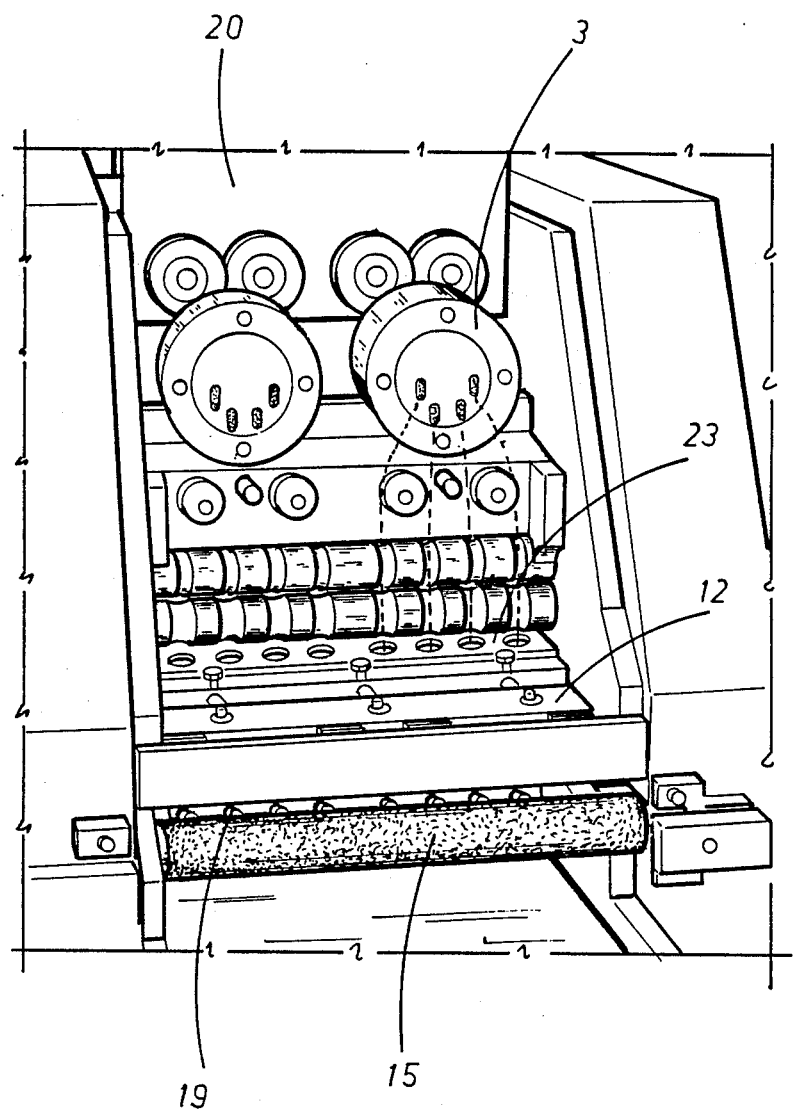
FIG. 1 is a perspective of the improved machine, viewed from the front.

With reference to the above drawings, 1 denotes a first unit by which pasta mix is fed into the machine; such a unit comprises in a screw feeder 2, and a plate 3, fitted to the end of the screw and affording a plurality of holes 4 from which the mix is extruded in a number of sticks 5.

The unit 1 is charged by an apparatus incorporating a hopper 20, this in turn being provided with a relative screw 21 that keeps the screw feeder 2 supplied with the mix in continuous fashion.

The pasta stick 5 issuing from each hole 4 drops toward a cutting unit 6, by which it is severed into discrete cylindrical pellets 7.

The cutting unit 6 is located downstream of the feed unit 1 and comprises a first plate 8 affording a set of holes 9, numbering one for each of the pasta sticks 5.

23 denotes a second plate breasted with the top surface of the first plate 8, which affords second holes 24 disposed coaxial with the first holes 9, through which the pasta sticks 5 are directed; the single second hole 24 exhibits radial dimensions greater than those of the first hole 9, and is of shape such as will favor the entry of the stick 5 and facilitate its passage toward the first hole 9.

12 denotes a blade breasted with the underside of the first plate 8, which is capable of movement through a looped path; in a first stretch of such a path, the blade 12 strokes horizontally, parallel and breasted with the first plate 8, moving between two limit positions: retracted, and extended to the point where the cutting edge passes through the pasta stick 5 emerging from the first hole 9 and severs it into discrete cylindrical plugs 7.

In a second stretch of the looped path, the blade 12 rotates downward, in such a manner as to accompany the descending pellet of pasta 7 and urge it toward a gathering and shaping unit, denoted 13 in its entirety, which will shortly be described.

The first plate 8 also incorporates a first seat 10, longitudinally disposed and emerging at one end into the first hole 9, that functions as guide for a rod 11 capable of reciprocating within the plate between two limit positions: a retracted position, and an extended position in which its butt end 11a projects beyond the end of the seat 10 and into the first hole 9 in order to separate the pasta stick 5 from the internal wall of the hole.

22 denotes a second seat formed in that part of the underside of the first plate 8 which is offered to the blade 12, one end of which merges with the first hole 9; the purpose of this second seat is to create a gap between the plate and the blade that will prevent the blade from becoming soiled and thus avoid any risk of binding between the two adjacent surfaces.

Figure 2:
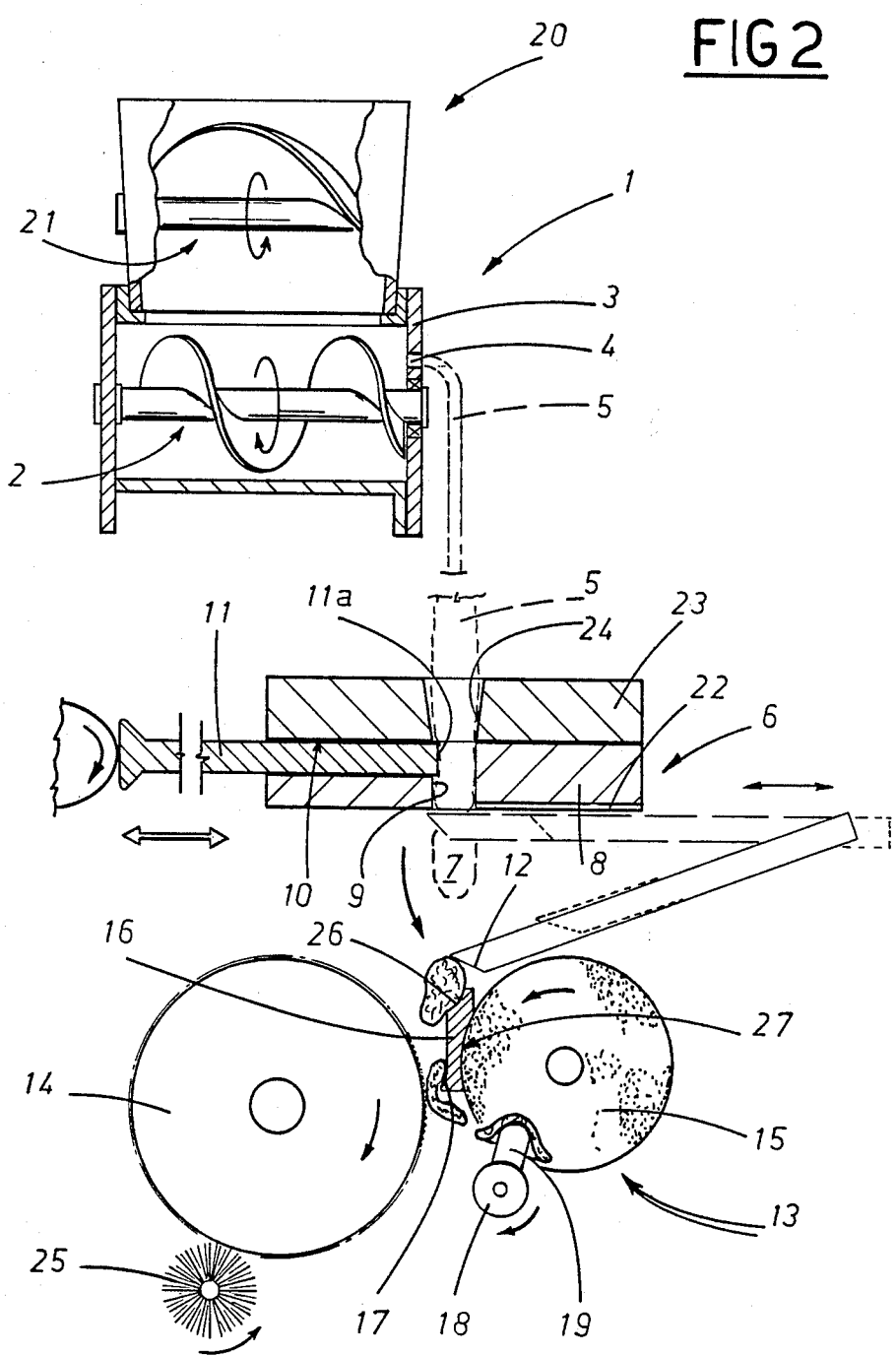
FIG. 2 provides a schematic representation of the construction and operation of certain essential parts of the machine, in which the various devices illustrated are not drawn to scale.

As mentioned above, cylindrical pellets of pasta 7 cut by the blade 12 are carried toward a gathering and shaping unit 13 by the downward motion of the blade itself. The unit 13 in question is located downstream of the cutting unit 6, and consists in a first roller 14, fashioned in rigid material, and a second roller 15 of soft material, positioned either side of a vertically disposed forming plate 16 the bottom edge of which affords a bead 17 directed toward and interacting with the first roller 14 to the end of flattening and curling the pellet 7, one surface of which remains in contact with the bead 17 throughout; the pasta is thus caused to wrap around the bead 17 as in FIG. 2.

The forming plate 16 affords a concave recess 26 at the edge opposite from the bead 17, the purpose of which is to channel the descending pasta pellet 7 neatly into the space between the forming plate 16 and the first roller 14, ready for shaping.

Once flattened and curled, the pasta pellet 7 is picked up by the second roller 15; this rotates in the opposite direction to that of the first roller 14 and works in conjunction with a third roller 18, which in turn rotates in the opposite direction to that of the second roller 15 and is provided with a projection 19 that sinks into the second roller 15 during rotation, in such a way that the flattened pasta pellet 7 is impinged upon and formed into the characteristic cupped shape of "orecchiette".

The surface 27 of the forming plate 16 offered to the second roller 15 is concave, and presents a profile that appears as an arc to a circle of radius marginally greater than that of the roller 15, such that the roller 15 is able to rotate freely, and the pasta pellet 7 can be easily picked up.

The first roller 14 has a knurled surface and is flanked beneath by a tangentially disposed revolving brush 25, which turns in the opposite direction to the knurled surface and serves to keep it clean.

Figure 3:
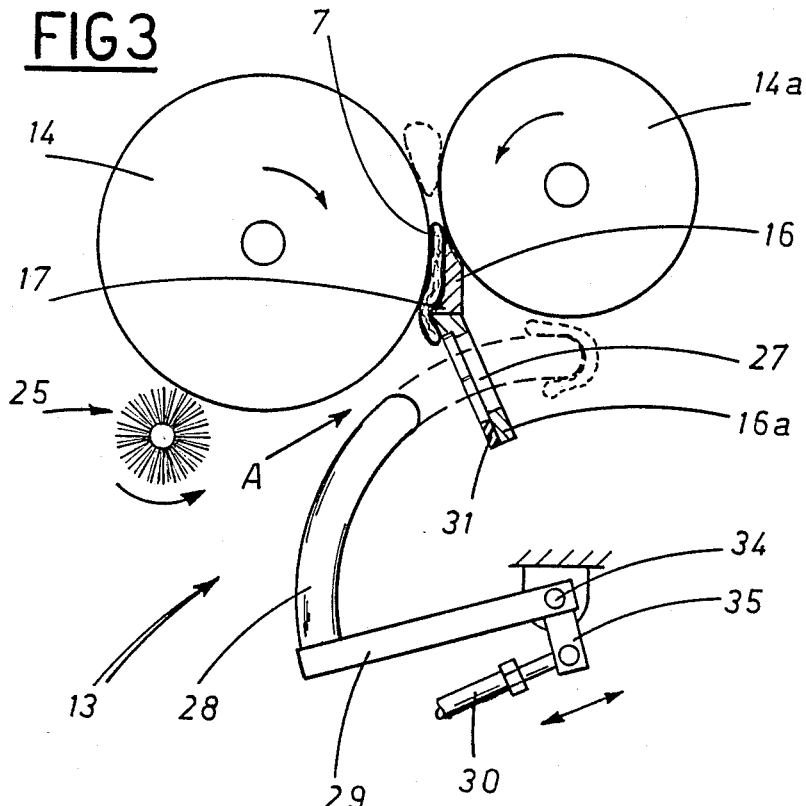
FIG. 3 provides a schematic representation of the construction and operation of an essential part of the machine, seen in an alternative embodiment to that of FIG. 2.
Figure 4:
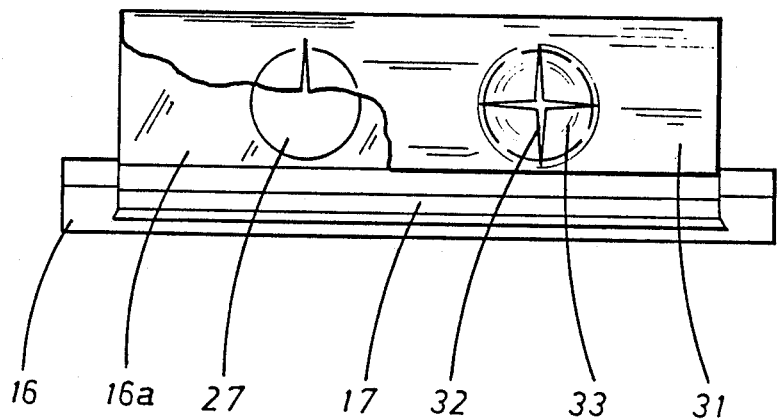
FIG. 4 is a front elevation of the device of FIG. 3 viewed from 'A', in enlarged scale.

In an alternative embodiment of the machine, the unit 13 which gathers up and shapes the cylindrical pellet of pasta 7 appears as in FIGS. 3 and 4, with first and second rollers 14 and 14a both embodied in rigid material. The two rollers rotate in opposite directions about parallel axes, flanking one another and distanced apart such that the gap between them is less than the diameter of the first hole 9 in the first plate 8 through which the pasta stick 5 is made to pass, and the descending pellet 7 is taken up between their surfaces and flattened.

Similarly, in this embodiment, the first and second rollers 14 and 14a are positioned on either side of the forming plate 16, and use is made of a second forming plate 16a, positioned beneath; more exactly, the second forming plate 16a extends downward from the first forming plate 16, angled in relation to its vertical axis and directed away from the first roller 14. The second forming plate 16a exhibits at least one hole 27, located near to the bead 17 on the first forming plate 16, affording passage to a finger 28 the transverse dimensions of which will be less than the diameter of the hole 27.

The finger 28 is capable of movement between two limit positions: retracted and distanced from the hole 27, standing by until the flattened pellet of pasta 7 has been positioned over the hole 27; and extended, such that the end of the finger 28 passes through the hole 27, investing the flattened pasta and shaping it into a cup with the assistance of the hole itself.

In a preferred embodiment of the second forming plate 16a, the surface directed toward the first roller 14 is faced with a strip of soft, flexible material 31 exhibiting a plurality of cuts 32; the cuts are made in the part of the strip that covers the hole 27, coincident with its diameters, in such a way as to create a plurality of flaps 33 that bend into the hole 27 when forced by the finger 28 as it passes through. Thus, one has a supple diaphragm that operates in conjunction with the finger 28 in imparting the cupped shape to each flattened pasta pellet 7. The flexible strip 31 will be attached to the forming plate 16a either with an adhesive (as in FIGS. 3 and 4) or using threaded fasteners, in such a way as to enable replacement.

Likewise in the preferred embodiment illustrated, the finger 28 exhibits a curved profile, and is carried and moved between its two limit positions by a bracket 29, one end of which rigidly attached to the finger, the remaining end pivoted about a fixed axis 34. The pivoted end of the bracket 29 is also rigidly attached to one end of an arm 35, the other end of which hinges with a connecting rod 30 forming part of a conventional rod-and-crank mechanism (not illustrated) from which the finger 28 derives its movement.

Needless to say, the first and second forming plates 16 and 16a might be embodied integrally.

What is claimed:

1. An improved machine for manufacturing short cut pasta, comprising:
    an infeed unit for receiving pasta mix, comprising a first screw feeder, the end of which is associated with a plate having at least one hole from which a continuous stick of pasta is extruded and allowed to fall;
    a cutting unit, into which the pasta stick descends and is severed into discrete cylindrical pellets, said cutting unit being located downstream of the infeed unit and comprising a first plate having a first hole for each stick of pasta through which the stick is made to pass, said first plate being provided with a first seat one end of which emerges into the first hole and serves as a guide for a rod able to reciprocate between a retracted position, and an extended position, said rod having a butt end projecting beyond an end of the seat and into the first hole in order to separate the pasta stick from the wall of the hole; and a blade positioned against an underside of the first plate, said blade being capable of movement through a looped path comprising a first stretch in which said blade strokes horizontally, parallel and against the first plate, and moving between a retracted position and an extended position to a point where a cutting edge of said blade passes through and severs the pasta stick into a cut cylindrical pellet, and a second stretch in which said blade rotates downward, said cut cylindrical pellet accompanying said blade in its descent;
    a gathering and shaping unit by which the cut cylindrical pasta pellet is gathered and shaped, said gathering and shaping unit being located downstream of the cutting unit and comprising a first roller of a rigid material, and a second roller of a soft material, said rollers being positioned on either side of a vertically disposed forming plate, said forming plate having a bead at a bottom edge thereof directed toward and interacting with the first roller so that said pellet wraps around the bead while one of its surfaces remains in direct contact with said first roller; a third roller, positioned beneath the forming plate on the same side as that occupied by the second roller, which rotates in the opposite direction to that of the second roller in the same direction of said first roller, said third roller being provided with a projection that sinks into the second roller during rotation of said third roller, in such a way that the pasta pellet will be impinged upon and shaped into a cup; and means, located beneath said first roller serving to clean an outer surface of the first roller.

2. The machine as in claim 1, wherein the first screw feeder associates uppermost with a loading and storage apparatus of the type incorporating a hopper, said hopper being provided internally with a relative second screw that serves to keep the first screw charged continuously with pasta mix.

3. The machine as in claim 1, further comprising a second plate contacting the top of the first plate, having a second hole disposed coaxial with the first hole and possessed of radial dimensions greater than those of the first hole, the purpose of which is to admit the pasta stick and facilitate its progress toward the first hole.

4. The machine as in claim 1, wherein said means serving to clean the outer surface of the first roller comprises a revolving brush disposed tangentially to the outer surface of the first roller and rotating in the opposite direction thereto.

5. The machine as in claim 1, wherein the forming plate is provided with a concave recess at an edge opposite from that incorporating the bead, the purpose of which is to channel the descending cylindrical pellet of pasta into the space existing between the forming plate and the first roller.

6. The machine as in claim 1, wherein the first roller is embodied with a knurled cylindrical surface.

7. The machine as in claim 1, wherein the surface of the forming plate opposite to the second roller is concave, and profiled as an arc to a circle of radius marginally greater than that of the second roller.

8. The machine as in claim 1, wherein the outer surface of the second roller that interacts with the projection is of concave shape.

9. An improved machine for manufacturing short cut pasta, comprising:

an infeed unit for receiving pasta mix, comprising a first screw feeder the end of which is associated with a plate having at least one hole from which a continuous stick of pasta is extruded and allowed to fall;

a cutting unit, into which the pasta stick descends and is severed into discrete cylindrical pellets, said cutting unit being located downstream of the infeed unit and comprising a first plate having a first hole for each stick of pasta through which the stick is made to pass, said first plate being provided with a first seat, one end of which emerges into the first hole and serves as a guide for a rod able to reciprocate between a retracted position and an extended position said rod having a butt end projecting beyond an end of the seat and into the first hole in order to separate the pasta stick from the wall of the hole; and a blade positioned against an underside of the first plate, said blade being capable of movement through a looped path comprising a first stretch in which said blade strokes horizontally, parallel and against the first plate, moving between a retracted position and an extended position to a point where a cutting edge of said blade passes through and severs the pasta stick into a cut, cylindrical pellet, and a second stretch in which said blade rotates downward, said cut cylindrical pellet accompanying said blade in its descent;

a gathering and shaping unit by which the cut cylindrical pasta pellet is gathered and shaped, located downstream of the cutting unit and comprising a first and a second roller both fashioned of a rigid material, which rotate in opposite directions about parallel axes, flanking one another and distanced apart such that the gap between them will be less than the diameter of the first hole in the first plate through which the pasta stick is made to pass and the descending pellet can be taken up between their outer surfaces and flattened; a first vertically disposed forming plate, located substantially between the first and second rollers, the bottom edge of which affords a bead directed toward and interacting with the first roller so that said pellet wraps around the bead while one of its surfaces remains in direct contact with said first roller; a second forming plate, positioned beneath the first forming plate and extending downward therefrom, said second forming plate exhibiting at least one hole, located near the bead, affording passage of a finger having transverse dimensions less than the diameter of said at least one hole and capable of movement between a retracted and a distanced position from the at least one hole, said finger standing by while the flattened pellet of pasta moves into position over the hole; and extended, such that an end of the finger passes through the hole, contacting the flattened pellet of pasta and shaping it into a cup with the assistance of the hole itself; and means by and from which the finger is carried and derives its movement.

10. The machine as in claim 9, wherein the surface of the second forming plate that is directed toward the first roller is faced with a strip of soft, flexible material exhibiting a plurality of cuts made in the part that covers said at least one hole and coinciding with given diameters thereof, in such a way as to create a plurality of flaps that bend into said at least one hole when forced by the finger as said finger passes through, and thus provide a supple diaphragm that operates in conjunction with the finger and said at least one hole in imparting a cupped shape to the flattened pellet of pasta.

11. The machine as in claim 9, wherein the second forming plate is angled away from the first roller, in relation to the vertical axis of the first plate, and the finger exhibits a curved profile, and wherein said means by and from which the finger is carried and derives movement comprises a bracket, said bracket having one end rigidly attached to the finger, and a second opposite end pivoted about a fixed axis and rigidly attached to an arm, a projecting end of said arm being hinged to one end of a connecting rod.

12. The machine as in claim 9, wherein the first and second forming plates are embodied integrally.

* * * * *